UNITED STATES PATENT OFFICE.

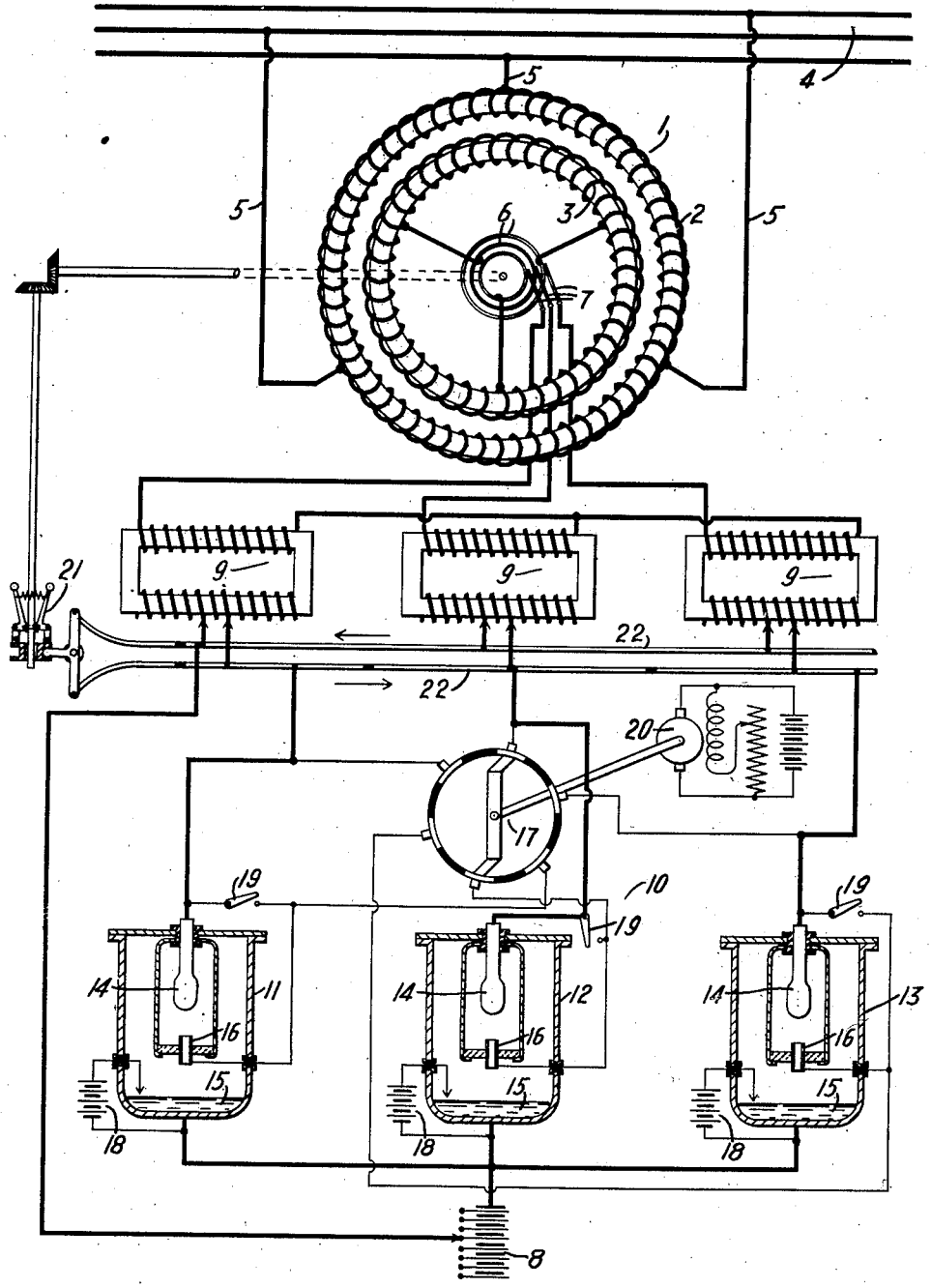

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

INDUCTION-MOTOR CONTROL.

1,374,559. Specification of Letters Patent. Patented Apr. 12, 1921.

Application filed October 9, 1915. Serial No. 54,952.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Induction-Motor Controls, of which the following is a specification.

My invention relates to systems of control for induction motors and similar asynchronous apparatus, and it has for its object to provide systems of the character indicated whereby an induction motor may be started and accelerated in a smooth and simple manner and whereby the excess energy given off by the motor during said accelerating process may be stored and subsequently returned to the machine for the control of the speed and power factor thereof.

The single figure of the accompanying drawing is a diagrammatic view of an induction motor, with its attendant supply and control circuits, illustrating a preferred form of my invention.

The speed of an induction motor, as is well known in the art, increases with a reduction in the voltage of the secondary member and, consequently, it is necessary, in order to produce low starting speeds, that the secondary member be permitted to develop relatively high voltage. A method commonly employed, hitherto, for permitting the development of high voltage has been to insert resistance members in circuit with the secondary winding, but this method is obviously wasteful and inefficient, as the energy derived from the secondary winding is dissipated in heat and lost. By my invention, I connect the secondary winding of an induction motor, through a rectifying or converting device, to a storage battery so that the necessary secondary voltage is developed in overcoming the back electromotive force of the battery, and the energy given off by said secondary member is stored in the battery. I further employ a rectifying or converting device which is reversible in function and, in the subsequent normal operation of the motor, I return the energy of said battery to the secondary member for the control of the voltage and slip frequency thereof, thus determining the speed of rotation and, further, by adjusting the excitation of the secondary member thus produced, I am enabled to control the power factor of an induction motor over wide ranges.

Referring to the accompanying drawing for a more detailed understanding of my invention, I show an induction motor at 1, comprising a primary member or winding 2 and a secondary member or winding 3. The primary winding 2 may be of any desired or suitable type and is shown arranged for three-phase operation, deriving energy from suitable mains 4 through leads 5—5. The secondary member 3 is of the wound type and is provided with slip rings 6 on which bear brushes 7 for interchanging energy between said secondary member and a storage battery 8 through transformers 9—9 and a reversible vacuum-type converting system, as, for example, of the character described and claimed in a copending application of Lewis W. Chubb, Serial No. 64,154, filed Nov. 29, 1915, patented July 27, 1920, No. 1,347,894, and assigned to the Westinghouse Electric & Manufacturing Company. Briefly described, the system 10 comprises a plurality of containers 11, 12, and 13, each of which is provided with an anode 14 and a cathode 15. Each of the anodes 14 is provided with a suppressor-type shield carrying a contracted throat member or members 16, as described in a copending application of S. W. Farnsworth, Serial No. 44,429, filed Aug. 9, 1915, patented July 3, 1917, No. 1,232,470, and assigned to the Westinghouse Electric & Manufacturing Company. A mechanically driven contact device 17 is associated with the system 10 and serves to successively connect each of the anodes 14 to its associated suppressor shield 16, the adjustment being such that current can flow from an anode 14 to its associated cathode 15 only when the corresponding member 16 is in connection with its anode. A suitable keep-alive means 18 is employed for maintaining the cathodes 15 in an active state.

If a unidirectional electromotive force be imposed upon the devices 11, 12 and 13 from the battery 8 and if it be assumed that the commutating device 17 is in the position shown, the collar 16 is connected to the associated anode lead. The upwardly moving stream of electrons from the cathode 15 produced by the keep-alive circuit 18 traverses the shield at 16 and impinges upon the anode 14, permitting the flow of current through the device 12 from the battery 8 and energizing the connected portion of the lower winding of the central transformer 9. At the same time, the collars 16 in the devices 11 and 13 are not in conductive connection with the respectively associated anodes and, therefore, said collars rapidly acquire a negative charge when the electron stream attempts to enter the anode space. Said accumulated negative charge repels other approaching electrons and thereby effectually prevents their impact upon the anode, thus preventing current flow through the devices 11 and 13 from the battery 8. As the brushes of the commutator device 17 sweep around, they successively discharge each collar member 16, permitting the flow of electrons 2 and the flow of current from the respectively associated anodes. The successive and periodic energization of the lower windings of the three transformers 9 produces an alternating-current flow in the secondary winding of the main induction motor.

Having thus described the construction of a system employing my invention, the operation is as follows: At the outset, it is desired that relatively high voltage be developed in the secondary member 3 and I accordingly may adjust either the transformers 9 or an adjustable tap on the battery 8 so that the resultant back electromotive force developed at the secondary winding has the desired magnitude. Energy developed in the secondary member 3 in the form of three-phase alternating current, is then rectified in the devices 11, 12 and 13 and supplied to the battery 8 where it is stored for future use. When employed in this manner for ordinary rectification, the suppressor members 16 may be permanently connected to their respective anodes by the closure of suitable switches 19—19. As the motor 1 is accelerated, it is desirable that the voltage of the secondary member thereof be reduced and the controlling back electromotive force may therefore be lowered, either by adjusting the transformers 9 or by reducing the number of cells in the battery 8 that are included in circuit. When normal operation in the motor 1 has been attained, exciting current therefor may be derived from the battery 8 by employing the system 10 as a vacuum-type inverted converter, the frequency of the alternating current supplied to the secondary member 3 being determined by the speed of rotation of the device 17 which, in turn, is determined by the speed of a driving motor 20. By varying the frequency of the current supplied to the secondary member 3, the slip thereof may be regulated and thus the speed may be controlled and, furthermore, by adjusting the voltage supplied to the secondary member 3, the amount of exciting current flowing therethrough is rendered subject to adjustment, furnishing simple and effective means for controlling the power factor of the motor.

I may, if desired, cause the adjustment of the voltage of the secondary member 3 to be effected automatically, either by the adjustment of the secondary taps in the transformers 9—9 or by the adjustment of the tap on the battery 8. For example, a centrifugal device 21 may be actuated by the rotor of the motor 1 and may, in turn, operate suitable rods 22—22 to separate the taps on the secondary windings of the transformers 9—9 as the speed of the motor 1 increases, with a resultant decrease in the voltage across the secondary member thereof. By this means, the speed-torque characteristics of the motor 21 may be widely modified to satisfy different operating conditions.

I claim as my invention:—

1. The combination with an induction motor provided with a wound secondary member, of a constant-potential device connected to said secondary member for absorbing energy therefrom in the speed control of said motor, a transformer connected between said secondary member and said device, and automatic means for adjusting the ratio of transformation of said transformer, subject to control by the speed of said motor.

2. The combination with an induction motor provided with a secondary winding, of a rectifying device capable of operation as a rectifier or as a de-rectifier, a storage battery, an adjustable transformer, connections from said secondary winding through said transformer and said rectifying device to said battery, whereby, during acceleration, energy derived from said winding may be rectified and supplied to said battery means whereby said acceleration may be controlled by adjusting the ratio of transformation of said transformer, and connecting means for varying the local circuits of said rectifier whereby, during normal operation, energy derived from said battery may be converted into the form of alternating current and supplied to said secondary winding, to effect speed and power-factor control of said motor, the degree of said control being adjustable by again altering the ratio of transformation of said transformer.

In testimony whereof, I have hereunto subscribed my name this 29th day of Sept., 1915.

CHARLES LE G. FORTESCUE.